(12) United States Patent
Monsowitz et al.

(10) Patent No.: US 12,073,435 B2
(45) Date of Patent: *Aug. 27, 2024

(54) ADVERTISEMENTS RESPONSIVE TO COUPON STATES

(71) Applicant: Amazon Technologies, Inc., Seattle, WA (US)

(72) Inventors: Eric S. Monsowitz, Seattle, WA (US); Michal Jonathan Geller, Seattle, WA (US); Brandon R. I. Chang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 503 days.

This patent is subject to a terminal disclaimer.

(21) Appl. No.: 16/849,170

(22) Filed: Apr. 15, 2020

(65) Prior Publication Data

US 2020/0242665 A1    Jul. 30, 2020

Related U.S. Application Data

(63) Continuation of application No. 16/747,320, filed on Jan. 20, 2020, now Pat. No. 11,720,926, which is a continuation of application No. 13/589,382, filed on Aug. 20, 2012, now Pat. No. 10,540,693.

(51) Int. Cl.
*G06Q 30/00*        (2023.01)
*G06Q 30/0251*    (2023.01)

(52) U.S. Cl.
CPC .............................. *G06Q 30/0269* (2013.01)

(58) Field of Classification Search
None
See application file for complete search history.

(56) References Cited

U.S. PATENT DOCUMENTS

| | | | |
|---|---|---|---|
| 5,970,469 | A  | 10/1999 | Scroggie et al. |
| 6,134,532 | A  | 10/2000 | Lazarus et al. |
| 6,292,786 | B1 | 9/2001  | Deaton et al. |
| 6,332,128 | B1 | 12/2001 | Nicholson |
| 6,336,098 | B1 | 1/2002  | Fortenberry et al. |
| 6,571,216 | B1 | 5/2003  | Garg et al. |
| 6,925,441 | B1 | 8/2005  | Jones, III et al. |

(Continued)

FOREIGN PATENT DOCUMENTS

| | | |
|---|---|---|
| CA | 2596307 | 8/2006 |
| EP | 1164529 | 12/2001 |

(Continued)

OTHER PUBLICATIONS

European Patent Application EP10827351.7 filed on Oct. 22, 2010, Extended European Search Report mailed on Oct. 8, 2014.

(Continued)

*Primary Examiner* — Michael W Schmucker
(74) *Attorney, Agent, or Firm* — Thomas Horstemeyer, LLP

(57) ABSTRACT

Various embodiments provide advertising that is aware of digital coupon states and user states. Digital coupons can be issued to users and redeemed with third party retailer systems and/or point of sale systems. An advertisement including a digital coupon to be presented to a user is determined. Data encoding the advertisement is sent to the third party retailer system or the point of sale system.

20 Claims, 5 Drawing Sheets

(56) References Cited

U.S. PATENT DOCUMENTS

| | | |
|---|---|---|
| 6,980,962 B1 | 12/2005 | Arganbright et al. |
| 7,013,286 B1 | 3/2006 | Aggarwal et al. |
| 7,124,092 B2 | 10/2006 | O'Toole, Jr. et al. |
| 7,225,142 B1 | 5/2007 | Apte et al. |
| 2001/0014868 A1 | 8/2001 | Herz et al. |
| 2001/0021914 A1 | 9/2001 | Jacobi et al. |
| 2001/0049661 A1 | 12/2001 | Power et al. |
| 2002/0010627 A1 | 1/2002 | Lerat |
| 2002/0036654 A1 | 3/2002 | Evans et al. |
| 2002/0046099 A1 | 4/2002 | Frengut et al. |
| 2002/0049657 A1 | 4/2002 | Main et al. |
| 2002/0053076 A1 | 5/2002 | Landesmann |
| 2002/0138346 A1 | 9/2002 | Kodaka et al. |
| 2002/0138348 A1 | 9/2002 | Narayan et al. |
| 2002/0161634 A1 | 10/2002 | Kaars |
| 2002/0169673 A1 | 11/2002 | Prorock et al. |
| 2002/0178051 A1 | 11/2002 | Golden et al. |
| 2002/0194067 A1 | 12/2002 | Wechsler et al. |
| 2002/0198785 A1 | 12/2002 | Chae |
| 2003/0130883 A1 | 7/2003 | Schroeder et al. |
| 2003/0135414 A1 | 7/2003 | Tai |
| 2003/0233276 A1 | 12/2003 | Pearlman et al. |
| 2003/0233320 A1 | 12/2003 | Connor |
| 2004/0010627 A1 | 1/2004 | Ellis et al. |
| 2004/0054575 A1 | 3/2004 | Marshall |
| 2004/0054589 A1 | 3/2004 | Nicholas et al. |
| 2004/0083170 A1 | 4/2004 | Bam et al. |
| 2004/0098305 A1 | 5/2004 | Truong et al. |
| 2004/0168083 A1 | 8/2004 | Gasparini et al. |
| 2004/0249712 A1 | 12/2004 | Brown et al. |
| 2004/0267611 A1 | 12/2004 | Hoerenz |
| 2005/0071228 A1 | 3/2005 | Bortolin et al. |
| 2005/0131761 A1 | 6/2005 | Trika et al. |
| 2005/0160003 A1 | 7/2005 | Berardi et al. |
| 2005/0242177 A1 | 11/2005 | Roberge et al. |
| 2006/0069616 A1 | 3/2006 | Bau |
| 2006/0080173 A1* | 4/2006 | Robinson ............. G06Q 20/387 705/14.35 |
| 2006/0080297 A1 | 4/2006 | Barth |
| 2006/0173830 A1 | 8/2006 | Smyth et al. |
| 2006/0190330 A1 | 8/2006 | Tollinger et al. |
| 2006/0235764 A1 | 10/2006 | Bamborough et al. |
| 2006/0287913 A1 | 12/2006 | Baluja |
| 2006/0293959 A1 | 12/2006 | Hogan |
| 2007/0100688 A1 | 5/2007 | Book |
| 2007/0130090 A1 | 6/2007 | Staib et al. |
| 2007/0156528 A1 | 7/2007 | Hopp et al. |
| 2007/0162337 A1 | 7/2007 | Hawkins et al. |
| 2007/0198339 A1 | 8/2007 | Shen et al. |
| 2007/0208729 A1 | 9/2007 | Martino |
| 2007/0244745 A1 | 10/2007 | Boal |
| 2008/0052169 A1 | 2/2008 | O'Shea et al. |
| 2008/0059208 A1 | 3/2008 | Rockfeller et al. |
| 2008/0065490 A1 | 3/2008 | Novick et al. |
| 2008/0097830 A1 | 4/2008 | Kim |
| 2008/0097906 A1 | 4/2008 | Williams et al. |
| 2008/0154707 A1 | 6/2008 | Mittal et al. |
| 2008/0154727 A1 | 6/2008 | Carlson |
| 2008/0195460 A1 | 8/2008 | Varghese |
| 2008/0195483 A1 | 8/2008 | Moore |
| 2008/0262914 A1 | 10/2008 | Suveyke et al. |
| 2008/0262928 A1 | 10/2008 | Michaelis |
| 2008/0313011 A1 | 12/2008 | Rose et al. |
| 2008/0319846 A1 | 12/2008 | Leming et al. |
| 2009/0000212 A1 | 1/2009 | Kennedy |
| 2009/0028054 A1 | 1/2009 | Kumar et al. |
| 2009/0106115 A1 | 4/2009 | James et al. |
| 2009/0144164 A1 | 6/2009 | Wane et al. |
| 2009/0171766 A1 | 7/2009 | Schiff et al. |
| 2009/0172551 A1 | 7/2009 | Kane et al. |
| 2009/0192869 A1 | 7/2009 | Irvine et al. |
| 2009/0198563 A1 | 8/2009 | Tung et al. |
| 2009/0204485 A1 | 8/2009 | Wills et al. |
| 2009/0234745 A1 | 9/2009 | Ramer et al. |
| 2009/0254931 A1 | 10/2009 | Pizzurro et al. |
| 2009/0271264 A1 | 10/2009 | Regmi et al. |
| 2009/0288012 A1 | 11/2009 | Herte et al. |
| 2009/0307143 A1 | 12/2009 | Reistad et al. |
| 2010/0218128 A1 | 8/2010 | Bonat et al. |
| 2010/0257058 A1 | 10/2010 | Karidi et al. |
| 2012/0109736 A1 | 5/2012 | Laor |
| 2012/0136706 A1* | 5/2012 | Chang ................ G06Q 30/0219 705/14.21 |
| 2012/0136707 A1* | 5/2012 | Chang ................ G06Q 30/0222 705/14.23 |
| 2012/0136708 A1 | 5/2012 | Chang et al. |
| 2012/0136710 A1 | 5/2012 | Chang et al. |
| 2012/0136712 A1 | 5/2012 | Chang et al. |

FOREIGN PATENT DOCUMENTS

| | | |
|---|---|---|
| JP | 11296587 | 10/1999 |
| JP | 2001319124 | 11/2001 |
| JP | 2001357279 | 12/2001 |
| JP | 2002083201 | 3/2002 |
| JP | 2002157266 | 5/2002 |
| JP | 2002279274 | 9/2002 |
| JP | 2003503762 | 1/2003 |
| JP | 2003076911 | 3/2003 |
| JP | 2003533763 | 11/2003 |
| JP | 2003536172 | 12/2003 |
| JP | 2004094406 | 3/2004 |
| JP | 2006133931 | 5/2004 |
| JP | 2005037563 | 2/2005 |
| JP | 2005503602 | 2/2005 |
| JP | 2005149187 | 6/2005 |
| JP | 2006023864 | 1/2006 |
| JP | 2006155317 | 6/2006 |
| JP | 2006277270 | 10/2006 |
| JP | 2006338638 | 12/2006 |
| JP | 2007509394 | 4/2007 |
| JP | 2007516537 | 6/2007 |
| JP | 2008052383 | 3/2008 |
| JP | 2008077521 | 4/2008 |
| JP | 2008107898 | 5/2008 |
| JP | 2009169766 | 7/2009 |
| JP | 2010218483 | 9/2010 |
| KR | 20060005153 | 1/2006 |
| KR | 20090000212 | 1/2009 |
| KR | 20090000643 | 1/2009 |
| WO | 200152155 | 7/2001 |
| WO | 2007059295 | 5/2007 |
| WO | 2009070475 | 6/2009 |

OTHER PUBLICATIONS

European Patent Application EP10827351.7 filed on Oct. 22, 2010, Office Action mailed on Apr. 10, 2017.

Canadian Patent Application CA2,777,957 filed on Oct. 22, 2010, 1st Office Action mailed on May 24, 2016.

Canadian Patent Application CA2,777,957 filed on Oct. 22, 2010, 2nd Office Action mailed on Apr. 21, 2017.

Canadian Patent Application CA2,777,957 filed on Oct. 22, 2010, 3rd Office Action mailed on Mar. 23, 2018.

Canadian Patent Application CA2,777,957 filed on Oct. 22, 2010, Notice of Allowance mailed on Apr. 2, 2019.

Chinese Patent Application CN201080048743.6 filed on Oct. 22, 2010, 1st Office Action mailed on Jul. 7, 2014.

Chinese Patent Application CN201080048743.6 filed on Oct. 22, 2010, 2nd Office Action mailed on Mar. 25, 2015.

Chinese Patent Application CN201080048743.6 filed on Oct. 22, 2010, 3rd Office Action mailed on Sep. 25, 2015.

Chinese Patent Application CN201080048743.6 filed on Oct. 22, 2010, 4th Office Action mailed on Mar. 31, 2016.

Japanese Patent Application JP2012-536901 filed on Oct. 22, 2010, Determination of Allowance mailed on Jan. 15, 2015.

Japanese Patent Application JP2012-536901 filed on Oct. 22, 2010, Notice of Reasons Rejection mailed on Jan. 14, 2014.

Korea Patent Application KR10-2012-7011453 filed on Oct. 22, 2010, Office Action mailed on May 15, 2017.

(56) References Cited

OTHER PUBLICATIONS

Korea Patent Application KR10-2012-7011453 filed on Oct. 22, 2010, Notice of Allowance mailed on Nov. 23, 2017.
Indian Patent Application 3584/DELNP/2012 filed on Oct. 22, 2010, Examintion Report mailed on Jun. 20, 2018.
PCT Patent Application PCT/US2010/053735 filed on Oct. 22, 2010, International Search Report and Written Opinion mailed on Dec. 17, 2010.
European Patent Application 10827352.5 filed on Oct. 22, 2010, Search Report mailed on Oct. 19, 2014.
European Patent Application 10827352.5 filed on Oct. 22, 2010, Office Action mailed on Apr. 10, 2017.
European Patent Application 10827352.5 filed on Oct. 22, 2010, Office Action mailed on Jul. 10, 2018.
Canadian Patent Application 2,777,959 filed on Oct. 22, 2010, Office Action mailed on Jul. 15, 2016.
Canadian Patent Application 2,777,959 filed on Oct. 22, 2010, Office Action mailed on Jul. 5, 2017.
Canadian Patent Application 2,777,959 filed on Oct. 22, 2010, Office Action mailed on Jul. 18, 2018.
Canadian Patent Application 2,777,959 filed on Oct. 22, 2010, Notice of Allowance mailed on Jul. 26, 2019.
Chinese Patent Application 201080048736.6 filed on Oct. 22, 2010, First Office Action mailed on Mar. 2, 2015.
Chinese Patent Application 201080048736.6 filed on Oct. 22, 2010, Second Office Action mailed on Oct. 29, 2015.
Japanese Patent Application 2012-536902 filed on Oct. 22, 2010, Office Action mailed on Jan. 7, 2014.
Japanese Patent Application 2012-536902 filed on Oct. 22, 2010, Notice of Allowance mailed on Jan. 7, 2014.
Korean Patent Application 10-2012-7011701 filed on Oct. 22, 2010, Office Action mailed on Oct. 18, 2016.
Korean Patent Application 10-2012-7011701 filed on Oct. 22, 2010, Office Action mailed on Apr. 28, 2017.
Indian Patent Application 3532/DELNP/2012 filed on Oct. 22, 2010, Office Action mailed on Sep. 26, 2018.
Korean Patent Application 10-2017-7021802 filed on Oct. 22, 2010, Office Action mailed on Nov. 2, 2017.
Korean Patent Application 10-2017-7021802 filed on Oct. 22, 2010, Office Action mailed on May 31, 2018.
PCT Patent Application PCT/US2010/053703 filed on Oct. 22, 2010, International Search Report and Written Opinion mailed on Dec. 23, 2010.
European Patent Application 10830413.0 filed on Oct. 22, 2010, Search Report mailed on Nov. 13, 2014.
European Patent Application 10830413.0 filed on Oct. 22, 2010, Search Report mailed on Jul. 27, 2018.
Canadian Patent Application 2,777,940 filed on Oct. 22, 2010, Office Action mailed on Jun. 15, 2016.
Chinese Patent Application 201080049186.X filed on Oct. 22, 2010, First Office Action mailed on Jun. 3, 2014.
Chinese Patent Application 201080049186.X filed on Oct. 22, 2010, Second Office Action mailed on Apr. 16, 2015.
Chinese Patent Application 201080049186.X filed on Oct. 22, 2010, Third Office Action mailed on Dec. 22, 2015.
Japanese Patent Application 2012-536898 filed on Oct. 22, 2010, Office Action mailed on Jan. 14, 2014.
Japanese Patent Application 2012-536898 filed on Oct. 22, 2010, Office Action mailed on Dec. 2, 2014.
Japanese Patent Application 2012-536898 filed on Oct. 22, 2010, Notice of Allowance mailed on Jun. 23, 2015.
Korean Patent Application 10-2012-7011238 filed on Oct. 22, 2010, Office Action mailed on Oct. 18, 2016.
Korean Patent Application 10-2012-7011238 filed on Oct. 22, 2010, Office Action mailed on Jan. 31, 2017.
Indian Patent Application 3529/DELNP/2012 filed on Oct. 22, 2010, Office Action mailed on May 7, 2018.
PCT Patent Application PCT/US2011/62220 filed on Nov. 28, 2011, International Search Report and Written Opinion mailed on Apr. 2, 2012.
European Patent Application 1184554.2 filed on Nov. 28, 2011, Search Report mailed on May 23, 2016.
Chinese Patent Application 201180052563.X filed on Nov. 28, 2011, First Office Action mailed on Jul. 9, 2015.
Chinese Patent Application 201180052563.X filed on Nov. 28, 2011, Second Office Action mailed on Mar. 2, 2016.
Japanese Patent Application 2013-536942 filed on Nov. 28, 2011, Office Action mailed on May 7, 2014.
U.S. Appl. No. 14/864,313, filed Sep. 24, 2015, Notice of Allowance mailed on Aug. 31, 2018.
U.S. Appl. No. 13/589,382 entitled "Advertisements Responsive to Coupon States" and filed on Aug. 20, 2012.(**Copy not provided).
U.S. Appl. No. 13/534,418 entitled "Systems and Methods for Interactive Advertising" and filed on Jun. 27, 2012.(**Copy not provided).
U.S. Appl. No. 13/276,821 entitled "Purchase Targeted Coupons" and filed on Oct. 19, 2011. (**Copy not provided).
U.S. Appl. No. 12/956,608 entitled "Digital Coupon System" and filed on Nov. 30, 2010.(**Copy not provided).
U.S. Appl. No. 12/956,638 entitled "Digital Coupon System" and filed on Nov. 30, 2010.(**Copy not provided).
U.S. Appl. No. 12/956,653 entitled "Digital Coupon System" and filed on Nov. 30, 2010.(**Copy not provided).
U.S. Appl. No. 12/956,658 entitled "Digital Coupon System" and filed on Nov. 30, 2010.(**Copy not provided).
U.S. Appl. No. 12/956,684 entitled "Digital Coupon System" and filed on Nov. 30, 2010.(**Copy not provided).
U.S. Appl. No. 13/589,382, filed Aug. 20, 2012, Notice of Allowance mailed on Sep. 12, 2019.
U.S. Appl. No. 13/589,382, filed Aug. 20, 2012, Response to Non-Final Office Action mailed on May 2, 2016.
U.S. Appl. No. 13/589,382, filed Aug. 20, 2012, Response to Non-Final Office Action mailed on Apr. 3, 2015.
U.S. Appl. No. 12/608,679, filed Oct. 29, 2009, Examiner's Answer mailed on Mar. 13, 2013.
U.S. Appl. No. 12/608,679, filed Oct. 29, 2009, Examiner's Answer mailed on Dec. 21, 2017.
U.S. Appl. No. 12/608,679, filed Oct. 29, 2009, Final Office Action mailed on Mar. 29, 2017.
U.S. Appl. No. 12/608,679, filed Oct. 29, 2009, Office Action mailed on Jul. 18, 2012.
U.S. Appl. No. 12/608,679, filed Oct. 29, 2009, Office Action mailed on Sep. 22, 2016.
U.S. Appl. No. 12/608,679, filed Oct. 29, 2009, Office Action mailed on Dec. 20, 2011.
U.S. Appl. No. 12/608,679, filed Oct. 29, 2009, Patent Board of Appeals Decision mailed on Jun. 24, 2016.
U.S. Appl. No. 12/608,679, filed Oct. 29, 2009, Patent Board of Appeals Decision mailed on Nov. 8, 2012.
U.S. Appl. No. 12/608,673, filed Oct. 29, 2009, Advisory Action mailed on Mar. 23, 2016.
U.S. Appl. No. 12/608,673, filed Oct. 29, 2009, Advisory Action mailed on Apr. 17, 2015.
U.S. Appl. No. 12/608,673, filed Oct. 29, 2009, Advisory Action mailed on May 26, 2016.
U.S. Appl. No. 12/608,673, filed Oct. 29, 2009, Final Office Action mailed on Feb. 5, 2015.
U.S. Appl. No. 12/608,673, filed Oct. 29, 2009, Final Office Action mailed on Jun. 1, 2012.
U.S. Appl. No. 12/608,673, filed Oct. 29, 2009, Final Office Action mailed on Dec. 3, 2015.
U.S. Appl. No. 12/608,673, filed Oct. 29, 2009, Non-Final Office Action mailed on Jan. 29, 2014.
U.S. Appl. No. 12/608,673, filed Oct. 29, 2009, Non-Final Office Action mailed on Jun. 12, 2015.
U.S. Appl. No. 12/608,673, filed Oct. 29, 2009, Non-Final Office Action mailed on Jul. 16, 2014.
U.S. Appl. No. 12/608,673, filed Oct. 29, 2009, Non-Final Office Action mailed on Dec. 23, 2011.
U.S. Appl. No. 12/608,673, filed Oct. 29, 2009, Response to Final Office Action mailed on Feb. 5, 2015.
U.S. Appl. No. 12/608,673, filed Oct. 29, 2009, Response to Final Office Action mailed on Jun. 1, 2012.

(56) References Cited

OTHER PUBLICATIONS

U.S. Appl. No. 12/608,673, filed Oct. 29, 2009, Response to Final Office Action mailed on Dec. 3, 2015.
U.S. Appl. No. 12/608,673, filed Oct. 29, 2009, Response to Non-Final Office Action mailed on Jan. 29, 2014.
U.S. Appl. No. 12/608,673, filed Oct. 29, 2009, Response to Non-Final Office Action mailed on Jun. 12, 2015.
U.S. Appl. No. 12/608,673, filed Oct. 29, 2009, Response to Non-Final Office Action mailed on Jul. 16, 2014.
U.S. Appl. No. 12/608,673, filed Oct. 29, 2009, Response to Non-Final Office Action mailed on Dec. 23, 2011.
U.S. Appl. No. 12/608,688, filed Oct. 29, 2009, Response to Office Action mailed on Jan. 6, 2012.
U.S. Appl. No. 12/608,688, filed Oct. 29, 2009, Response to Office Action mailed on Feb. 26, 2014.
U.S. Appl. No. 12/608,688, filed Oct. 29, 2009, Response to Office Action mailed on May 1, 2015.
U.S. Appl. No. 12/608,688, filed Oct. 29, 2009, Response to Office Action mailed on Jul. 20, 2012.
U.S. Appl. No. 12/608,688, filed Oct. 29, 2009, Response to Office Action mailed on Aug. 6, 2014.
U.S. Appl. No. 12/608,688, filed Oct. 29, 2009, Response to Office Action mailed on Dec. 14, 2012.
U.S. Appl. No. 12/608,688, filed Oct. 29, 2009, Advisory Action mailed on Jul. 14, 2015.
U.S. Appl. No. 12/608,688, filed Oct. 29, 2009, Office Action mailed on Jan. 6, 2012.
U.S. Appl. No. 12/608,688, filed Oct. 29, 2009, Office Action mailed on Feb. 26, 2014.
U.S. Appl. No. 12/608,688, filed Oct. 29, 2009, Office Action mailed on May 1, 2015.
U.S. Appl. No. 12/608,688, filed Oct. 29, 2009, Office Action mailed on Jul. 20, 2012.
U.S. Appl. No. 12/608,688, filed Oct. 29, 2009, Office Action mailed on Aug. 6, 2014.
U.S. Appl. No. 12/608,688, filed Oct. 29, 2009, Office Action mailed on Nov. 2, 2015.
U.S. Appl. No. 12/608,688, filed Oct. 29, 2009, Office Action mailed on Dec. 14, 2012.
U.S. Appl. No. 12/956,608, filed Nov. 30, 2010, Final Office Action mailed on Jun. 1, 2015.
U.S. Appl. No. 12/956,608, filed Nov. 30, 2010, Final Office Action mailed on Sep. 20, 2013.
U.S. Appl. No. 12/956,608, filed Nov. 30, 2010, Non-Final Office Action mailed on Jan. 5, 2016.
U.S. Appl. No. 12/956,608, filed Nov. 30, 2010, Non-Final Office Action mailed on Jan. 29, 2013.
U.S. Appl. No. 12/956,608, filed Nov. 30, 2010, Non-Final Office Action mailed on Jul. 30, 2015.
U.S. Appl. No. 12/956,608, filed Nov. 30, 2010, Non-Final Office Action mailed on Aug. 28, 2014.
U.S. Appl. No. 12/956,608, filed Nov. 30, 2010, Response to Final Office Action mailed on Jun. 1, 2015.
U.S. Appl. No. 12/956,608, filed Nov. 30, 2010, Response to Final Office Action mailed on Sep. 20, 2013.
U.S. Appl. No. 12/956,608, filed Nov. 30, 2010, Response to Non-Final Office Action mailed on Jan. 29, 2013.
U.S. Appl. No. 12/956,608, filed Nov. 30, 2010, Response to Non-Final Office Action mailed on Aug. 28, 2014.
U.S. Appl. No. 12/956,638, filed Nov. 30, 2010, Advisory Action mailed on Aug. 5, 2015.
U.S. Appl. No. 12/956,638, filed Nov. 30, 2010, Final Office Action mailed on May 19, 2015.
U.S. Appl. No. 12/956,638, filed Nov. 30, 2010, Final Office Action mailed on Sep. 26, 2013.
U.S. Appl. No. 12/956,638, filed Nov. 30, 2010, Non-Final Office Action mailed on Jan. 29, 2016.
U.S. Appl. No. 12/956,638, filed Nov. 30, 2010, Non-Final Office Action mailed on Feb. 5, 2013.
U.S. Appl. No. 12/956,638, filed Nov. 30, 2010, Non-Final Office Action mailed on Aug. 28, 2014.
U.S. Appl. No. 12/956,638, filed Nov. 30, 2010, Response of Non-Final Office Action mailed on Feb. 5, 2013.
U.S. Appl. No. 12/956,638, filed Nov. 30, 2010, Response to Final Office Action mailed on May 19, 2015.
U.S. Appl. No. 12/956,638, filed Nov. 30, 2010, Response to Final Office Action mailed on Sep. 26, 2013.
U.S. Appl. No. 12/956,638, filed Nov. 30, 2010, Response to Non-Final Office Action mailed on Aug. 28, 2014.
U.S. Appl. No. 12/956,653, filed Nov. 30, 2010, Final Office Action mailed on Sep. 26, 2013.
U.S. Appl. No. 12/956,653, filed Nov. 30, 2010, Non-Final Office Action mailed on Feb. 5, 2013.
U.S. Appl. No. 12/956,653, filed Nov. 30, 2010, Non-Final Office Action mailed on Sep. 5, 2014.
U.S. Appl. No. 12/956,653, filed Nov. 30, 2010, Response to Final Office Action mailed on Sep. 26, 2013.
U.S. Appl. No. 12/956,653, filed Nov. 30, 2010, Response to Non-Final Office Action mailed on Feb. 5, 2013.
U.S. Appl. No. 12/956,658, filed Nov. 30, 2010, Final Office Action mailed on Jun. 10, 2015.
U.S. Appl. No. 12/956,658, filed Nov. 30, 2010, Final Office Action mailed on Sep. 11, 2013.
U.S. Appl. No. 12/956,658, filed Nov. 30, 2010, Non-Final Office Action mailed on Feb. 15, 2013.
U.S. Appl. No. 12/956,658, filed Nov. 30, 2010, Non-Final Office Action mailed on Jun. 23, 2016.
U.S. Appl. No. 12/956,658, filed Nov. 30, 2010, Non-Final Office Action mailed on Sep. 9, 2014.
U.S. Appl. No. 12/956,658, filed Nov. 30, 2010, Non-Final Office Action mailed on Sep. 23, 2015.
U.S. Appl. No. 12/956,658, filed Nov. 30, 2010, Response to Final Office Action mailed on Jun. 10, 2015.
U.S. Appl. No. 12/956,658, filed Nov. 30, 2010, Response to Final Office Action mailed on Sep. 11, 2013.
U.S. Appl. No. 12/956,658, filed Nov. 30, 2010, Response to Non-Final Office Action mailed on Feb. 15, 2013.
U.S. Appl. No. 12/956,658, filed Nov. 30, 2010, Response to Non-Final Office Action mailed on Sep. 9, 2014.
U.S. Appl. No. 12/956,684, filed Nov. 30, 2010, Final Office Action mailed on Sep. 30, 2013.
U.S. Appl. No. 12/956,684, filed Nov. 30, 2010, Non-Final Office Action mailed on Feb. 1, 2013.
U.S. Appl. No. 12/956,684, filed Nov. 30, 2010, Non-Final Office Action mailed on Sep. 9, 2014.
U.S. Appl. No. 12/956,684, filed Nov. 30, 2010, Response to Final Office Action mailed on Sep. 30, 2013.
U.S. Appl. No. 12/956,684, filed Nov. 30, 2010, Response to Non-Final Office Action mailed on Feb. 1, 2013.
U.S. Appl. No. 13/589,382, filed Aug. 20, 2012, Final Office Action mailed on Nov. 9, 2015.
U.S. Appl. No. 13/589,382, filed Aug. 20, 2012, Final Office Action mailed on Nov. 16, 2016.
U.S. Appl. No. 13/589,382, filed Aug. 20, 2012, Non-Final Office Action mailed on Apr. 3, 2015.
U.S. Appl. No. 13/589,382, filed Aug. 20, 2012, Non-Final Office Action mailed on May 2, 2016.
U.S. Appl. No. 13/589,382, filed Aug. 20, 2012, Response to Final Office Action mailed on Nov. 9, 2015.
Japanese Patent Application 2013-536942 filed on Nov. 28, 2011, Office Action mailed on Dec. 2, 2014.
Japanese Patent Application 2013-536942 filed on Nov. 28, 2011, Notice of Allowance mailed on Jan. 6, 2015.
Indian Patent Application 3751/DELNP/2013 filed on Nov. 28, 2011, Office Action mailed on Feb. 25, 2019.
Canadian Patent Application 2,812,603 filed on Nov. 28, 2011, Office Action mailed on Oct. 16, 2014.
Canadian Patent Application 2,812,603 filed on Nov. 28, 2011, Office Action mailed on Dec. 4, 2015.
Canadian Patent Application 2,812,603 filed on Nov. 28, 2011, Office Action mailed on Nov. 15, 2016.

(56) References Cited

OTHER PUBLICATIONS

PCT Patent Application PCT/US2010/053732 filed on Oct. 22, 2010, International Search Report and Written Opinion mailed on Dec. 21, 2010.
European Patent Application EP10827351.7 filed on Oct. 22, 2010, Office Action mailed on Jul. 12, 2018.
European Patent Application EP10827351.7 filed on Oct. 22, 2010, Office Action mailed on Nov. 30, 2018.
Korean Patent Application 10-2012-7011701 filed on Oct. 22, 2010, Office Action mailed on Jul. 5, 2017.
Definition of Authenticate in English. Authenticate: Definition of Authenticate in Oxford Dictionary. Oxford Dictionaries, n.d. Web. Sep. 4, 2013.

* cited by examiner

ADVERTISEMENTS RESPONSIVE TO COUPON STATES

CROSS-REFERENCE TO RELATED APPLICATIONS

This application is a continuation of and claims the benefit of co-pending U.S. patent application Ser. No. 16/747,320, filed Jan. 20, 2020, entitled "ADVERTISEMENTS RESPONSIVE TO COUPON STATES," which is a continuation of, and claims priority to U.S. patent application Ser. No. 13/589,382, filed Aug. 20, 2012, entitled "ADVERTISEMENTS RESPONSIVE TO COUPON STATES," which issued as U.S. Pat. No. 10,540,693 on Jan. 21, 2020, each of which is incorporated herein by reference in their entirety.

BACKGROUND

Advertisers may decide to reach potential customers through the use of coupons. Conventional coupons are often published in a newspaper or other publication and lack various features. Conventional coupons published in a publication may not be targeted at specific users a coupon issuer wishes to reach and often lack relevance to content with which they are published. Additionally, redemption may not be automated. Oftentimes, users also must physically clip and retain a physical copy of a conventional coupon in order to redeem the coupon with a retailer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing advertisements that are dynamically generated based at least in part on coupon states. When marketers present digital coupons as advertisements, such coupons may be presented irrespective of factors relating to coupon state or user state, such as whether a particular user has redeemed the coupon, whether the coupon has expired, whether the particular user has previously purchased the item, and/or other factors. The static nature of advertisements with digital coupons may waste advertising expenses and valuable marketing opportunities on advertising for coupons that are already used, expired, irrelevant, or are otherwise not the best use of the marketing opportunity.

Figure 1:
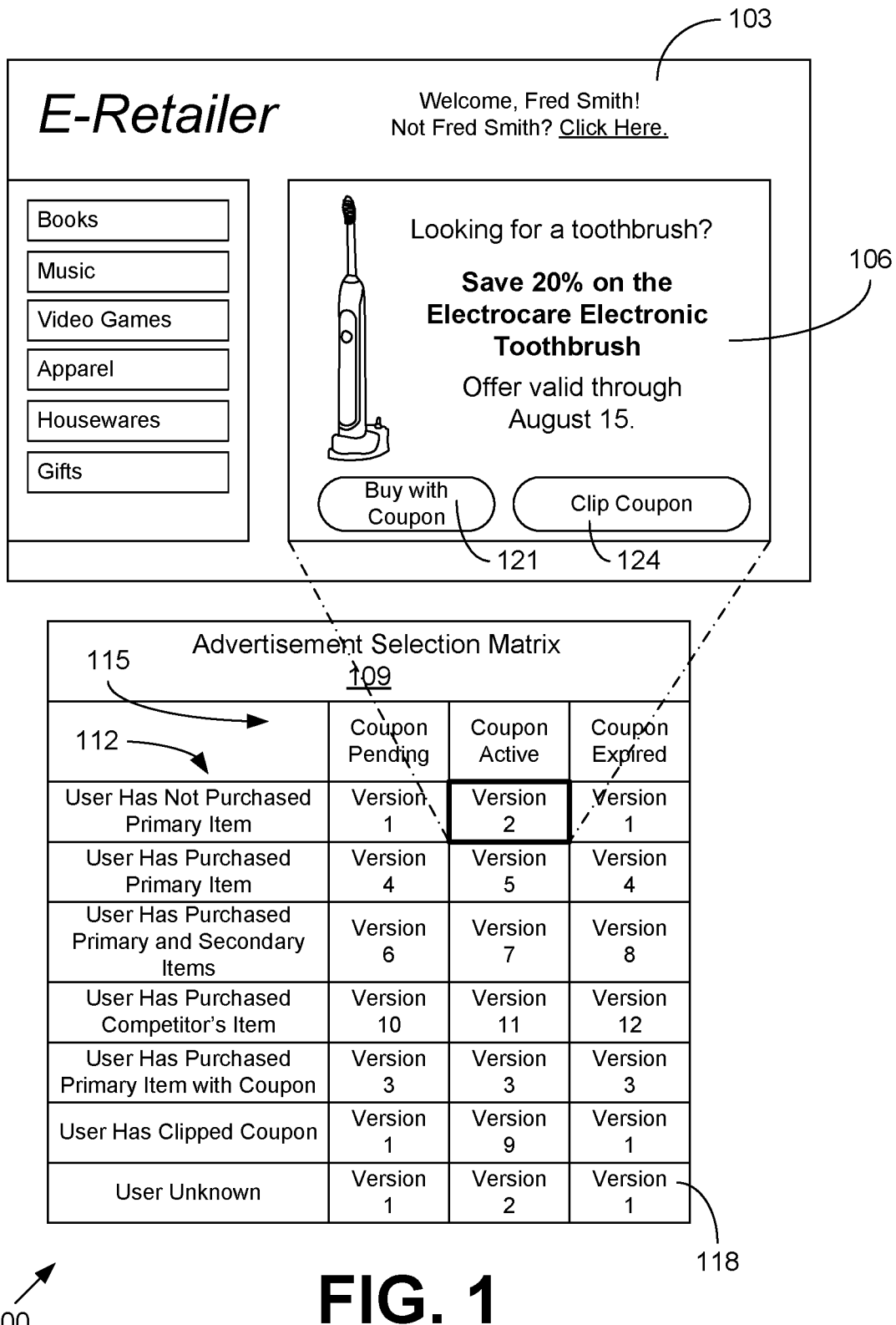
FIG. 1 is a drawing that illustrates a relationship between a user interface that includes an advertisement and an advertisement selection matrix according to various embodiments of the present disclosure.

Various embodiments of the present disclosure dynamically generate or select advertisements that may include a coupon based at least in part on a state associated with the coupon and/or a state associated with the user. To this end, different creative treatments for an advertisement may be selected according to coupon and/or user state. With reference to FIG. 1, shown is a drawing 100 that illustrates a relationship between a user interface 103 that includes an advertisement 106 and an advertisement selection matrix 109 according to various embodiments. The user interface 103, which may correspond to a network page, a mobile application screen, etc. is associated with an identified user (e.g., "Fred Smith"), who may or may not be authenticated.

The advertisement 106 that is to be included in the user interface 103 is first determined. Then, one of multiple versions (or creative treatments) of the advertisement 106 is generated based at least in part on user state and/or digital coupon state according to the advertisement selection matrix 109. The advertisement 106 may be dynamically generated or selected from stored versions of the advertisement 106. The advertisement selection matrix 109 may have a first dimension 112 corresponding to user state and a second dimension 115 corresponding to digital coupon state. Several non-limiting state examples are provided for each of the first dimension 112 and the second dimension 115. Each intersection of the first dimension 112 and the second dimension 115 responds to a respective condition 118.

The first dimension 112 shows user states that indicate whether the user has purchased a primary item featured in the advertisement 106, whether the user has purchased the primary item and another secondary item featured in the advertisement 106, whether the user has purchased an item of a competitor, whether the user has purchased the primary item with the digital coupon, whether the user has clipped the digital coupon, whether the user is unknown, and so on. The second dimension 115 shows coupon states that indicate whether the coupon is pending, whether the coupon is active, whether the coupon has expired, and so on.

In the non-limiting example of FIG. 1, the advertisement 106 corresponds to "version 2" of the advertisement 106, which corresponds to the condition 118 in the advertisement selection matrix 109 that indicates that the user has not purchased in the primary item and the digital coupon is currently active. The primary item in this case corresponds to an "Electrocare Electronic Toothbrush," and the advertisement 106 provides a digital coupon for 20% off the particular item. In some scenarios where a digital coupon is rendered, the advertisement 106 may include a buy with coupon control 121, a clip coupon control 124, or other controls. The buy with coupon control 121, when selected, may initiate a purchase of the item being advertised using the particular digital coupon featured in the advertisement 106. Similar controls may be employed to add the item to a shopping cart, wish list, gift list, etc. with the particular digital coupon. The clip coupon control 124 may be provided to enable a user to "clip" the digital coupon, thereby allowing the user to redeem the digital coupon for a future purchase.

The user state may be an important factor in selecting from the various versions of the advertisement 106. If the user had already purchased the particular item, a different version of the advertisement 106 may be selected to promote toothpaste, brush heads, or other accessories for the electronic toothbrush. Different digital coupon offers, for the same or a different item, may be provided in some cases. If a competing item has been purchased, the advertisement 106 may be tailored to encourage users to switch to the particular electronic toothbrush. If the digital coupon has been clipped by the user, an advertisement exhorting the user to use the coupon may be provided. If the digital coupon has been used by the user, another digital coupon relating to a secondary item such as an accessory may be provided.

The state of the coupon itself may also be significant. If the digital coupon is pending, a promotional advertisement 106 without a coupon may be provided. If the digital coupon has expired, a promotional advertisement 106 without a coupon may be provided.

Under some conditions 118, it may be the case that no version of an advertisement is specified. It is noted that different conditions 118 in the advertisement selection matrix 109 may be associated with different versions of the advertisement 106. However, the same version of an advertisement 106 may be selected under multiple conditions 118.

Various techniques relating to digital coupons are disclosed in U.S. patent application Ser. No. 12/956,608 entitled "DIGITAL COUPON SYSTEM" and filed on Nov. 30, 2010, U.S. patent application Ser. No. 12/956,638 entitled "DIGITAL COUPON SYSTEM" and filed on Nov. 30, 2010, U.S. patent application Ser. No. 12/956,653 entitled "DIGITAL COUPON SYSTEM" and filed on Nov. 30, 2010, U.S. patent application Ser. No. 12/956,658 entitled "DIGITAL COUPON SYSTEM" and filed on Nov. 30, 2010, U.S. patent application Ser. No. 12/956,684 entitled "DIGITAL COUPON SYSTEM" and filed on Nov. 30, 2010, U.S. patent application Ser. No. 13/276,821 entitled "PURCHASE TARGETED COUPONS" and filed on Oct. 19, 2011, and U.S. patent application Ser. No. 13/534,418 entitled "SYSTEMS AND METHODS FOR INTERACTIVE ADVERTISING" and filed on Jun. 27, 2012, all of which are incorporated herein by reference in their entirety. In the following discussion, a general description of the system and its components is provided, followed by a discussion of the operation of the same.

Figure 2:
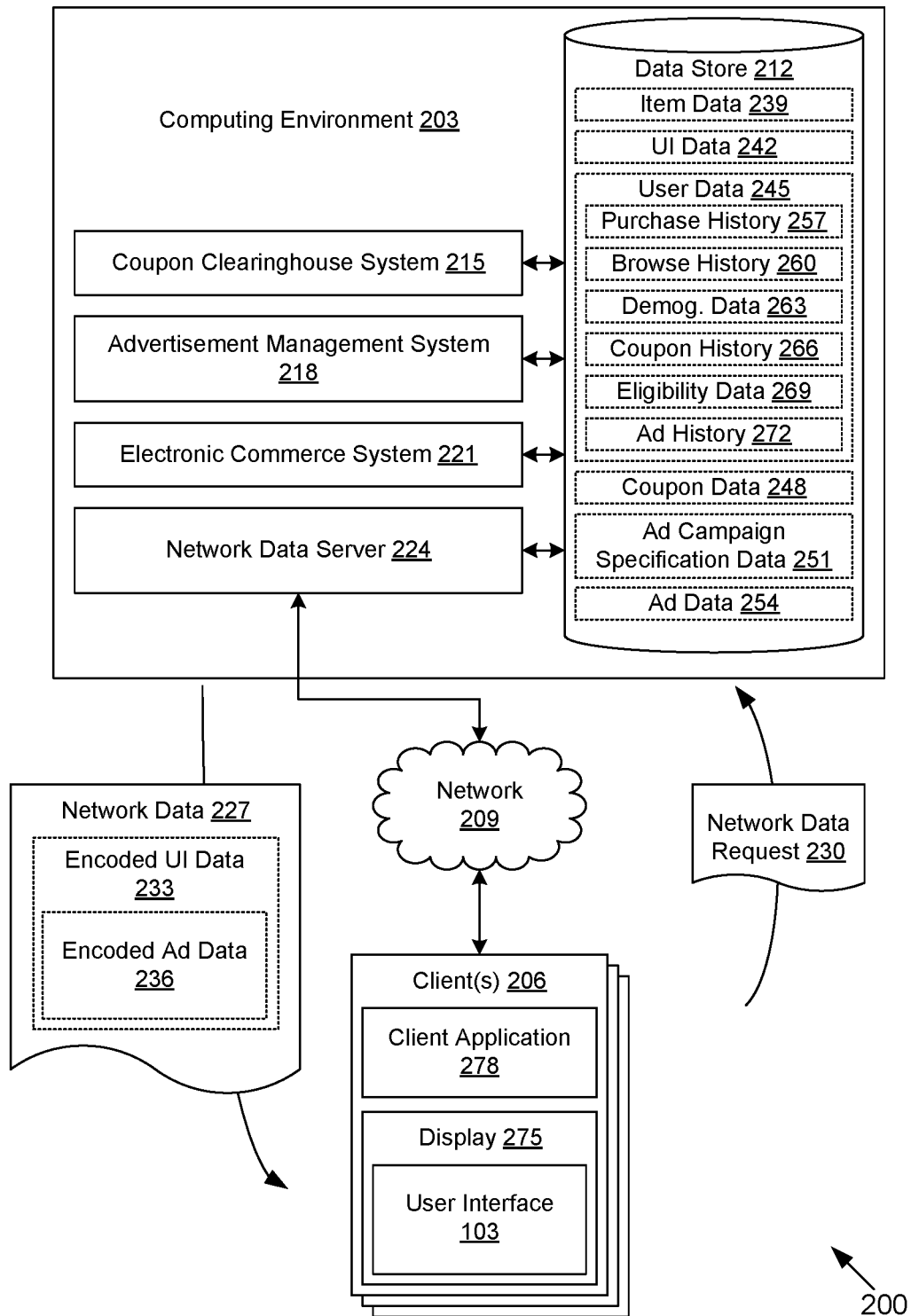
FIG. 2 is a drawing of a networked environment according to various embodiments of the present disclosure.

With reference to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a coupon clearinghouse system 215, an advertisement management system 218, an electronic commerce system 221, a network data server 224, and other applications, services, processes, systems, engines, or functionality not discussed in detail herein. The coupon clearinghouse system 215 is executed to facilitate distribution and redemption of digital coupons as will be described herein. The coupon clearinghouse system 215 can receive a coupon specification from a coupon issuer that defines the various properties and/or restrictions associated with a digital coupon funded by the coupon issuer. In turn, the coupon clearinghouse system 215 can make these digital coupons available to users by way of the advertisement management system 218.

Users may "clip" these coupons or associate the digital coupons with a user account. Users can then redeem these digital coupons with the electronic commerce system 221, a third party retailer, a point of sale system, and/or other retailer outlets, where the coupon clearinghouse system 215 facilitates authentication of the user, validation of the digital coupon, and encumbrance of the digital coupon. In this context, encumbrance of a digital coupon can refer to expiring the digital coupon or decrementing a number of uses available for the digital coupon. The coupon clearinghouse system 215 can also receive purchase confirmations and/or settlement requests from the electronic commerce system 221, third party retailer systems, point of sale systems, or other retail outlets in connection with purchases made by users for which a digital coupon issued by the coupon clearinghouse system 215 to the user was used.

Accordingly, the coupon clearinghouse system 215 can issue reimbursements to the electronic commerce system 221, third party retailer systems, point of sale systems, or other retail outlets and/or their operators for discounts or other promotions designated by the digital coupon. The coupon clearinghouse system 215 can also generate reporting metrics for a coupon issuer that includes various statistics and information regarding digital coupon redemption, the users that clip digital coupons, user purchasing history, user browsing history, etc. Additionally, the coupon clearinghouse system 215 can generate an invoice for a coupon issuer in connection with reimbursements paid to the electronic commerce system 221, third party retailer sites, and/or point of sale systems.

The advertisement management system 218 is executed to determine advertisements 106 (FIG. 1) to be presented to users within a user interface 103. Such a user interface 103 may correspond to a network page such as a web page, a mobile application screen, and/or other forms of user interfaces 103. The advertisement 106 may be associated with one or more digital coupons. The advertisement management system 218 may determine the advertisement 106 based at least in part on user behavior, user demographics, and/or other targeting data. Alternatively, the advertisement management system 218 may determine the advertisement 106 according to a rotation in a predefined sequence or a randomized sequence.

Once the advertisement management system 218 determines the advertisement 106, the advertisement management system 218 may be configured to select one of multiple versions of the advertisement 106 according to a state associated with the user and/or a state associated with a digital coupon. In one embodiment, the advertisement management system 218 employs an advertisement selection matrix 109 (FIG. 1) to select a version of the advertisement 106.

The electronic commerce system 221 is executed in order to facilitate the online purchase of items over the network 209. As used herein, the term "item" may refer to a product, good, service, software download, multimedia download, social networking profile, or any combination, bundle, or package thereof, that may be offered for sale, purchase, rental, lease, download, and/or any other form of consumption as may be appreciated. The electronic commerce system 221 also performs various backend functions associated with the online presence of a merchant in order to facilitate the online purchase of items. For example, the electronic commerce system 221 may generate user interfaces 103 or portions thereof that are provided to clients 206 for the purposes of selecting items for purchase, rental, download, lease, or other forms of consumption. The electronic commerce system 221 may be configured to perform recognition, identification, and authentication functions for users. In addition, the electronic commerce system 221 may be configured to request advertisements 106 from the advertisement management system 218 to be included in the user interfaces 103.

The network data server 224 is executed to serve up network data 227 to clients 206 over the network 209 in response to network data requests 230. The network data request 230 may include a uniform resource locator (URL), post data, query string data, item identifiers, user identifiers, session identifiers, and/or other data. The network data 227 may be generated by the advertisement management system 218, the electronic commerce system 221, and/or other systems. The network data 227 may include encoded user interface (UI) data 233, which may in turn include encoded advertisement data 236 and other data. In various embodiments, the network data server 224 may comprise a commercially available hypertext transfer protocol (HTTP) server such as, for example, Apache® HTTP Server, Apache® Tomcat®, Microsoft® Internet Information Services (IIS), and so on.

The data stored in the data store 212 includes, for example, item data 239, user interface data 242, user data 245, coupon data 248, advertisement campaign specification data 251, advertisement data 254, and potentially other data. The item data 239 may include various data relating to items offered through or otherwise known to the electronic commerce system 221, the advertisement management system 218, and the coupon clearinghouse system 215. The item data 239 may include, for example, titles, descriptions, quantities, conditions, dimensions, images, options, weights, customer reviews, customer ratings, keywords, shipping restrictions, prices, tax classifications, unique identifiers, and any other data related to items.

The user interface data 242 includes data that may be used by the electronic commerce system 221 or other systems in generating user interfaces 103. Such user interface data 242 may include hypertext markup language (HTML), extensible markup language (XML), cascading style sheets (CSS), extensible style sheet language transformations (XSLT), text, graphics, templates, audio, video, animations, and/or other data that may be used in generating user interfaces 103.

The user data 245 includes various data relating to registered and unregistered users of the electronic commerce system 221. Such users may also be referred to as customers or potential customers, as the case may be. The user data 245 may include a purchase history 257, browse history 260, demographic data 263, coupon history 266, eligibility data 269, advertisement history 272, and/or other data. The purchase history 257 indicates which items have been purchased by the user through the electronic commerce system 221. The browse history 260 indicates which items have been viewed, browsed, searched for, or otherwise selected by the user. In some cases, other data relating to items in shopping carts, wish lists, gift lists, etc. may be included in the user data 245. Such data may also indicate user interest in items.

The demographic data 263 may indicate age, gender, residence location, household income, and/or other demographic-related data that may be relevant for determining and selecting advertising. Such demographic data 263 may be explicitly set under the profile of the user or inferred from user interactions. The coupon history 266 indicates which digital coupons have been presented to the user, which digital coupons have been clipped and are still pending, which digital coupons have been redeemed, which digital coupons were clipped but were not redeemed, etc.

The eligibility data 269 may correspond to any data from which an advertiser may determine eligibility for a digital coupon. For example, the eligibility data 269 may indicate a click-trail through various pages in a network site has been completed by the user, where the click-trail is a prerequisite for the user to be eligible for a particular digital coupon. The advertisement history 272 may record the advertisements, and specific versions of the advertisements, which have been previously presented to the user. The user data 245 may include other data, e.g., security credentials to facilitate authentication, contact data, social networking data, and so on.

The coupon data 248 includes various data describing digital coupons. A coupon issuer can create a digital coupon campaign that is facilitated by the coupon clearinghouse system 215 by transmitting a coupon specification to the coupon clearinghouse system 215. A coupon specification can include various information regarding one or more digital coupons, such as a product identifier associated with the digital coupon as well as targeting criteria. Targeting criteria associated with a digital coupon can define requirements for users to which a digital coupon should be made available by the coupon clearinghouse system 215.

A coupon specification can also specify a promotion associated with a digital coupon, which can include a discount amount the coupon issuer is willing to reimburse to a third party retailer, a complimentary or discounted product provided is association with a particular product, and other coupon promotions as can be appreciated. A discount amount can include a fixed amount and/or a percentage of a selling price. The coupon specification can also specify a digital coupon expiration date and/or campaign budget, which describes a maximum amount a coupon issuer is willing to reimburse third party retailer sites and/or point of sale system operators in connection with a digital coupon campaign.

The coupon specification can further include retailer restrictions, which can limit those third party retailers with which a digital coupon is eligible to be redeemed. In this way, in one embodiment, a coupon issuer communicating with the coupon clearinghouse system 215 can limit a digital coupon campaign to authorized dealers of a product sold by the coupon issuer. In another embodiment, the coupon issuer can limit a digital coupon campaign to retailers that served a desired demographic.

The advertisement campaign specification data 251 outlines the parameters that control an advertising campaign initiated by an advertiser. Such an advertising campaign may include one or more digital coupons as described above. The advertisement campaign specification data 251 may include targeting criteria, eligibility criteria, budget configuration, payment instrument configuration, user interface 103 placement configuration, and/or other parameters. The advertisement campaign specification data 251 may define the conditions 118 (FIG. 1) under which a particular version of an advertisement 106 is selected for a given user. In one embodiment, such conditions 118 are defined by an advertisement selection matrix 109 having a first dimension 112 (FIG. 1) and a second dimension 115 (FIG. 1). The advertisement data 254 includes various other data relating to an advertisement campaign such as images, code, text, animations, video, audio, etc. for each of multiple versions of advertisements 106.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 275. The display 275 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 278 and/or other applications. The client application 278 may be executed in a client 206, for example, to access network content served up by the computing environment 203 and/or other servers, thereby rendering a user interface 103 on the display 275. The client application 278 may, for example, correspond to a browser, a mobile application, etc., and the user interface 103 may correspond to a network page, a mobile application screen, etc. The client 206 may be configured to execute applications beyond the client application 278 such as, for example, browsers, mobile applications, email applications, social networking applications, and/or other applications.

Next, a general description of the operation of the various components of the networked environment 200 is provided. To begin, the electronic commerce system 221 is configured to offer various items from the item data 239 for sale through a network site. The coupon clearinghouse system 215 is configured to recognize various digital coupons configured in the coupon data 248. An advertiser interfaces with the advertisement management system 218 to create advertising campaigns involving advertising that may be served up on various network sites, including a network site corresponding to the electronic commerce system 221. In creating an advertising campaign, the advertiser may create an advertisement 106 which is included in network pages or other user interfaces 130 under certain conditions.

Further, the advertiser may provide various versions of the advertisement 106 to the advertisement management system 218. Such versions may correspond to banner ads, animations, videos, text and images, and so on. The various versions of the advertisement 106 are stored in the advertisement data 254. One or more of the versions may present a digital coupon from the coupon data 248. The digital coupon may relate to an item available for purchase through the electronic commerce system 221. The digital coupon may otherwise be clippable and redeemable through approaches supported by the coupon clearinghouse system 215. Different digital coupons may be presented in different versions of the advertisement 106. Some versions of the advertisement 106 may not mention any digital coupon and may merely promote an item.

The advertiser may delineate various parameters associated with the advertising campaign in the advertisement campaign specification data 251. In some cases, the advertiser may provide an advertisement selection matrix 109 that outlines various conditions 118 under which a particular version of the advertisement 106 is selected. The conditions 118 may involve user state and digital coupon state.

The user state may involve criteria relating to the purchase history 257, the browse history 260, the coupon history 266, the eligibility data 269, advertisement history 272, and/or other user-related data. The digital coupon state may involve criteria relating to the coupon data 248, e.g., whether the coupon is pending or upcoming, whether the coupon is active, whether the coupon has been clipped (by the user or by a threshold number of users), whether the coupon has been redeemed (by the user or by a threshold number of users), whether the coupon is expired, whether the coupon is over-budget, and/or other coupon-related states that may be managed by the coupon clearinghouse system 215.

After the advertising campaign is configured, users may request various user interfaces 130 from the electronic commerce system 221 or other network sites. The user may be recognized, identified, and/or authenticated in order to determine the user data 245 corresponding to the user. The advertisement management system 218 determines an advertisement 106 to be presented to the user at a client 206. The advertisement management system 218 then selects one of multiple versions of the advertisement 106 to be presented to the user in the user interface 103. The selected version of the advertisement 106 is encoded and sent to the client 206 as encoded advertisement data 236 within the encoded user interface data 233 and in the network data 227. It is noted that the version may be selected from multiple stored versions, or the version may be dynamically generated as may be desired.

The version may be selected according to user state and digital coupon state, where one or more versions of the advertisement 106 may present one or more digital coupons. For example, different messaging may be provided when a digital coupon is pending activation versus when the digital coupon has expired. If the digital coupon has been clipped, the messaging may exhort the user to purchase the advertised item because the coupon will expire soon. If a user is not eligible for a coupon, the advertisement 106 may omit mention of a coupon. In one embodiment, a promotional value for the digital coupon may be determined based at least in part on the user state and the digital coupon state. For example, assuming that the digital coupon is in an active state, the digital coupon may provide 10% to users who have not purchased a competing item, and 20% off to users who have purchased a competing item.

In one example, the user state includes whether the user has purchased an item corresponding to the digital coupon. One version of the advertisement 106 may be selected when the user has purchased the item, and another version of the advertisement 106 may be selected when the user has not purchased the item. In a related example, the user state includes whether the user has purchased a competing item that competes with the item corresponding to the digital coupon. One version of the advertisement 106 may be selected when the user has purchased the competing item, and another version of the advertisement 106 may be selected when the user has not purchased the competing item.

In another example, the user state or the digital coupon state includes whether the digital coupon has been clipped. One version of the advertisement 106 may be selected when the digital coupon has been clipped, and another version of the advertisement 106 may be selected when the digital coupon has not been clipped. In another example, the user state or the digital coupon state includes whether the digital coupon has expired. One version of the advertisement 106 may be selected when the digital coupon has expired, and another version of the advertisement 106 may be selected when the digital coupon has not expired. In one embodiment, a notification may be sent to the advertiser when the digital coupon is expired, over-budget, etc.

In yet another example, the digital coupon state includes whether the digital coupon has been redeemed or has a remaining non-zero quantity for redemption, e.g., where the coupon is limited to the first 100 takers, etc. One version of the advertisement 106 may be selected when the digital coupon has the remaining quantity for redemption, and another version of the advertisement 106 may be selected when the digital coupon does not have the remaining quantity for redemption or has been redeemed. For example, the other version may correspond to a different coupon for the same or a different item, or the other version may merely be an advertisement 106 without a coupon.

Figure 3:
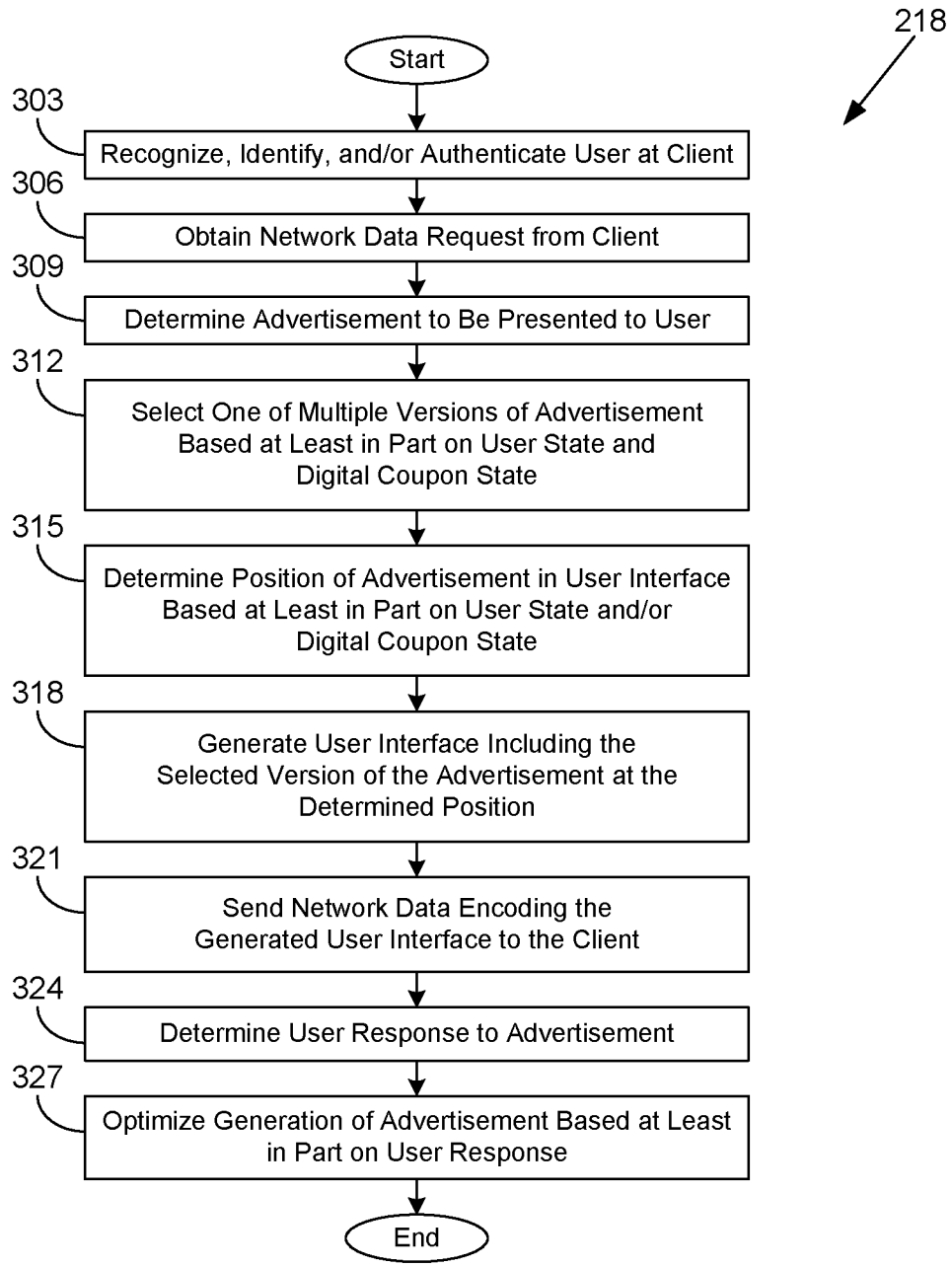
FIGS. 3 and 4 are flowcharts illustrating examples of functionality implemented as portions of an advertisement management system executed in a computing environment in the networked environment of FIG. 2 according to various embodiments of the present disclosure.

Referring next to FIG. 3, shown is a flowchart that provides one example of the operation of a portion of the advertisement management system 218 according to various embodiments. It is understood that the flowchart of FIG. 3 provides merely an example of the many different types of functional arrangements that may be employed to implement the operation of the portion of the advertisement management system 218 as described herein. As an alternative, the flowchart of FIG. 3 may be viewed as depicting an example of steps of a method implemented in the computing environment 203 (FIG. 2) according to one or more embodiments.

Beginning with box 303, the advertisement management system 218 recognizes, identifies, and/or authenticates a user or customer at a client 206 (FIG. 2). The user may be recognized, identified, and/or authenticated by way of an internet protocol (IP) address, a session identifier, a cookie identifier, a username and password combination, and/or by other approaches. In box 306, the advertisement management system 218 obtains a network data request 230 (FIG. 2) from the client 206 for a specific network page, mobile application screen, and/or other user interface 103 (FIG. 1).

In box 309, the advertisement management system 218 determines an advertisement 106 (FIG. 1) to be presented to the user. The advertisement 106 may be determined according to a link between the advertisement 106 and the requested user interface 103, targeting criteria matched by the user, a predetermined rotation, a randomized rotation, advertisements 106 previously presented to the user as recorded in the advertisement history 272 (FIG. 2), and/or other approaches. In box 312, the advertisement management system 218 generates one of multiple versions of the determined advertisement 106 based at least in part on a state associated with the user and/or a state associated with a digital coupon for an item, where the digital coupon is offered in one or more versions of the advertisement 106.

When the digital coupon is offered, the advertisement management system 218 may determine the promotional value for the digital coupon based at least in part on the state associated with the user and/or the state associated with the digital coupon. Further, the advertisement management system 218 may select a rendering of the promotional value for the digital coupon from multiple possible renderings of the promotional value for use in advertisement 106. As a non-limiting example, the advertisement management system 218 may determine whether to render a particular promotional value as a percentage or a dollar amount as a discount.

In box 315, the advertisement management system 218 may determine a position for the advertisement 106 in the user interface 103. Such a position may be determined based at least in part on a state associated with the user and/or a state associated with the digital coupon. For example, the advertisement 106 may be located at the top, left side, center, bottom, etc. of the user interface 103 depending on whether the coupon is active and on whether the user meets a desired demographic. Alternatively, the position of the advertisement 106 in the user interface 103 may be predetermined.

In box 318, the advertisement management system 218 generates the user interface 103, which includes the selected version of the advertisement 106 at the determined position. In box 321, the advertisement management system 218 sends network data 227 (FIG. 2) to the client 206 by way of the network 209 (FIG. 2). The network data 227 includes the encoded user interface data 233 (FIG. 2) and the encoded advertisement data 236 (FIG. 2).

In box 324, the advertisement management system 218 determines the user response to the advertisement 106. For example, the user may click on the advertisement 106, clip a digital coupon in the advertisement 106, initiate a purchase of the advertised item using a digital coupon in the advertisement 106, ignore the advertisement 106, and so on. In box 327, the advertisement management system 218 optimizes generation of the advertisement 106 based at least in part on the user response. For example, the advertisement 106 may be targeted or not targeted to the user or similar users in the future, the promotional value of the digital coupon may be optimized, the position of the advertisement 106 may be optimized, and so on. Thereafter, the portion of the advertisement management system 218 ends.

Figure 4:
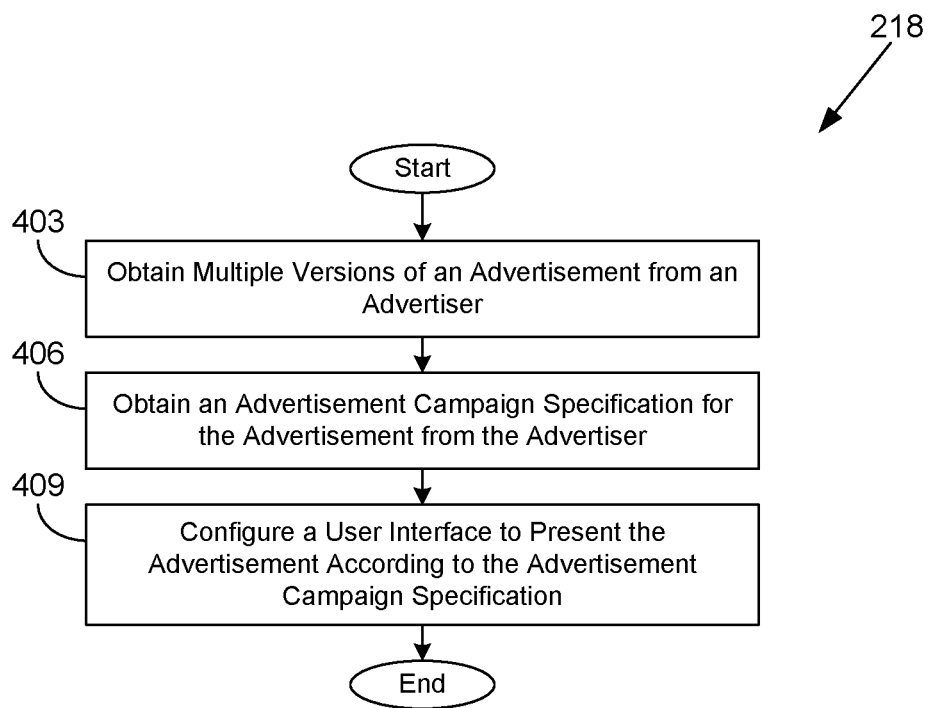

Turning now to FIG. 4, shown is a flowchart that provides one example of the operation of another portion of the advertisement management system 218 according to various embodiments. It is understood that the flowchart of FIG. 4 provides merely an example of the many different types of functional arrangements that may be employed to implement the operation of the portion of the advertisement management system 218 as described herein. As an alternative, the flowchart of FIG. 4 may be viewed as depicting an example of steps of a method implemented in the computing environment 203 (FIG. 2) according to one or more embodiments.

Beginning with box 403, the advertisement management system 218 obtains multiple versions of an advertisement 106 (FIG. 1) from an advertiser. One or more of the versions may include a digital coupon offer. In some cases, one or more of the versions may not include the digital coupon offer. In box 406, the advertisement management system 218 obtains an advertisement campaign specification for the advertisement 106 from the advertiser. The advertisement campaign specification is recorded in the advertisement campaign specification data 251 (FIG. 2).

In one embodiment, the advertisement campaign specification comprises an advertisement selection matrix 109 (FIG. 1) that specifies various conditions 118 (FIG. 1) with respect to user state and digital coupon state. In one example, the advertisement selection matrix 109 may have a first dimension 112 (FIG. 1) corresponding to multiple possible values for the user state parameter and a second dimension 115 (FIG. 1) corresponding to multiple possible values for the digital coupon state parameter. In box 409, the advertisement management system 218 configures user interface data 242 (FIG. 2) to present the advertisement 106 in a user interface 103 (FIG. 1) according to the advertisement campaign specification. Thereafter, the portion of the advertisement management system 218 ends.

Figure 5:
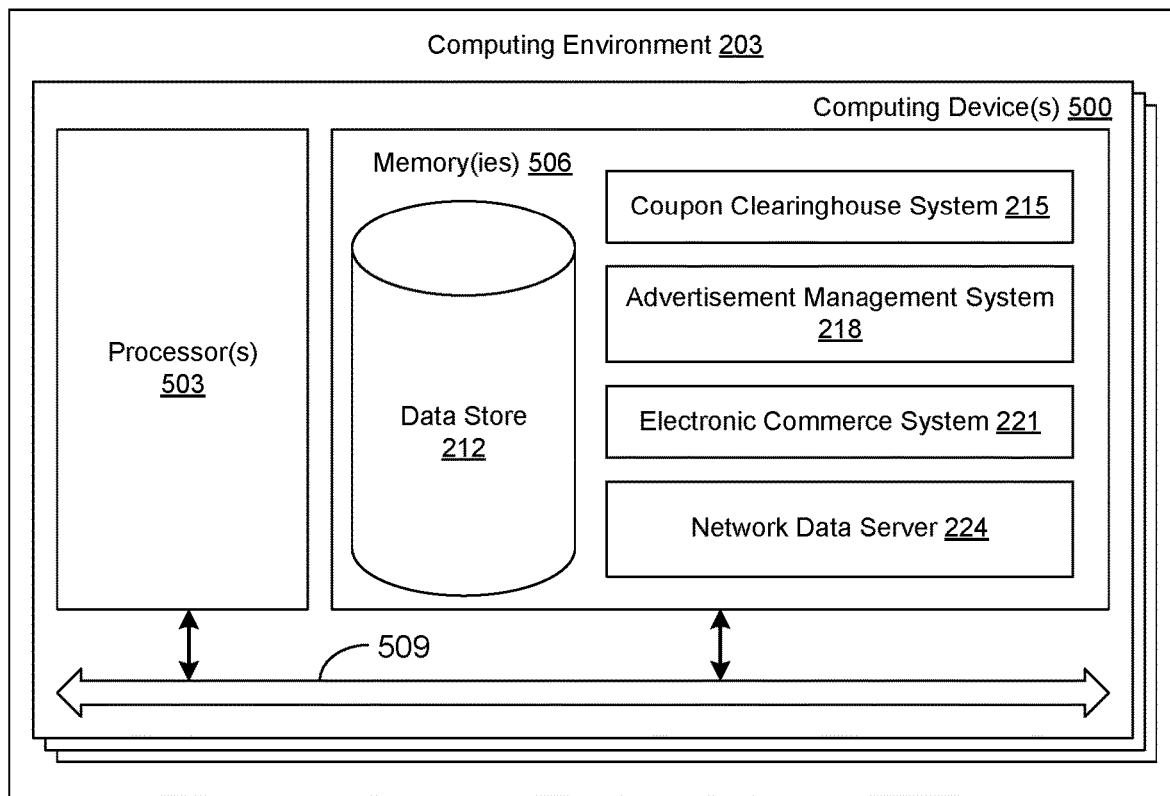
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the coupon clearinghouse system 215, the advertisement management system 218, the electronic commerce system 221, the network data server 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the coupon clearinghouse system 215, the advertisement management system 218, the electronic commerce system 221, the network data server 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 the functionality and operation of an implementation of portions of the advertisement management system 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the coupon clearinghouse system 215, the advertisement management system 218, the electronic commerce system 221, and the network data server 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   authenticating, by at least one computing device, a user associated with a user account based at least in part on a security credential corresponding to the user account;
   establishing, by the at least one computing device, a session corresponding to the user account and at least one of a third party retailer system or a point of sale system;
   determining, by the at least one computing device, an advertisement comprising at least one digital coupon for an item;
   generating, by the at least one computing device, a user interface including the advertisement, wherein the user interface facilitates clipping the at least one digital coupon and associating the at least one digital coupon with the user account, the user interface including the advertisement at a position based at least in part on a state associated with the digital coupon or a state associated with the user account; and
   sending, by the at least one computing device, data encoding the user interface including the advertisement to the at least one of the third party retailer system or the point of sale system.

2. The method of claim 1, further comprising receiving, by the at least one computing device, a request from the at least one of the third party retailer system or the point of sale system to apply the at least one digital coupon to the item in a virtual shopping cart.

3. The method of claim 1, further comprising receiving, by the at least one computing device, the security credential from the at least one of the third party retailer system or the point of sale system.

4. The method of claim 1, further comprising receiving, by the at least one computing device, at least one user identifier from the at least one of the third party retailer system or the point of sale system, the at least one user identifier corresponding to a virtual shopping cart and at least one of: an e-mail address, at least a portion of a shipping address, a telephone number, or a name.

5. The method of claim 4, wherein the at least one user identifier is hashed, wherein receiving the at least one user identifier comprises identifying the user associated with the user account by determining the user account and the at least one user identifier comprise a same hash signature.

6. The method of claim 1, further comprising:
   determining, by the at least one computing device, that the user has clipped the at least one digital coupon via the user interface; and
   associating, by the at least one computing device, the at least one digital coupon with the user account.

7. The method of claim 1, further comprising determining, by the at least one computing device, that the user has redeemed the at least one digital coupon for a promotion designated by the digital coupon.

8. The method of claim 1, further comprising:
   receiving, by the at least one computing device, a purchase confirmation associated with the at least one digital coupon; and
   encumbering, by the at least one computing device, the at least one digital coupon associated with the user account.

9. The method of claim 1, further comprising storing, by the at least one computing device, the state associated with the digital coupon, the state associated with the digital coupon comprising at least one of: an active state, a clipped state, a redeemed state, an expired state, or an over-budget state.

10. A system, comprising:
    at least one computing device; and
    an application executable by the at least one computing device, wherein the application, when executed by the at least one computing device, is configured to cause the at least one computing device to at least:
    receive a request from at least one of a third party retailer system or a point of sale system to apply at least one digital coupon to an item on behalf of a user;

establish a session with the at least one of the third party retailer system or the point of sale system corresponding to a user account associated with the user; and send data encoding a user interface including an advertisement comprising the digital coupon to the at least one of the third party retailer system or the point of sale system, wherein the user interface facilitates clipping the at least one digital coupon and associating the at least one digital coupon with the user account, the user interface including the advertisement at a position based at least in part on a state associated with the digital coupon or a state associated with the user account.

11. The system of claim 10, wherein the item is in a virtual shopping cart.

12. The system of claim 11, wherein the application is further configured to cause the at least one computing device to at least receive at least one user identifier from the at least one of the third party retailer system or the point of sale system, the at least one user identifier corresponding to the virtual shopping cart and at least one of: an e-mail address, at least a portion of a shipping address, a telephone number, or a name.

13. The system of claim 10, wherein the application is further configured to cause the at least one computing device to at least:
determine that the user has clipped the at least one digital coupon; and
associate the at least one digital coupon with the user account.

14. The system of claim 10, wherein the application is further configured to cause the at least one computing device to at least determine that the user has redeemed the at least one digital coupon for a purchase of the item.

15. The system of claim 10, wherein the application is further configured to cause the at least one computing device to at least:
receive a purchase confirmation associated with the at least one digital coupon; and
encumber the at least one digital coupon associated with the user account.

16. The system of claim 10, wherein the application is further configured to cause the at least one computing device to at least store the state associated with the digital coupon, the state associated with the digital coupon comprising at least one of: an active state, a clipped state, a redeemed state, an expired state, or an over-budget state.

17. The system of claim 10, wherein the state associated with the user account is based at least in part on a purchase history associated with the user account, a product browsing history associated with the user account, a coupon redemption history associated with the user account, at least one product preference specified by the user account, and marketing data maintained in a user profile associated with the user account.

18. A method, comprising:
authenticating, by at least one computing device, at least one of a third party retailer system or a point of sale system associated with a retailer account;
receiving, by the at least one computing device, at least one user identifier from the at least one of the third party retailer system or the point of sale system, the at least one user identifier corresponding to a user account and at least one of: an e-mail address, at least a portion of a shipping address, a telephone number, or a name;
determining, by the at least one computing device, at least one digital coupon associated with the user account, the at least one digital coupon being for an item;
presenting, by the at least one computing device, the at least one digital coupon in a user interface at a position that is based at least in part on a state associated with the at least one digital coupon or a state associated with the user account;
receiving, by the at least one computing device, a settlement request for the retailer account and from the at least one of the third party retailer system or the point of sale system, the settlement request being based at least in part on the at least one digital coupon being associated with the user account;
determining, by the at least one computing device, whether an order placed with the at least one digital coupon is cancelled; and
denying, by the at least one computing device, the settlement request for the retailer account based at least in part on determining that the order is cancelled.

19. The method of claim 18, further comprising unencumbering, by the at least one computing device, the at least one digital coupon.

20. The method of claim 18, further comprising receiving, by the at least one computing device, an order cancellation notice from the third party retailer system or the point of sale system.

\* \* \* \* \*